United States Patent
Lin

(10) Patent No.: US 9,377,968 B2
(45) Date of Patent: Jun. 28, 2016

(54) METHOD AND SYSTEM FOR USING TEMPLATES TO COMMUNICATE WITH NON-VOLATILE MEMORY

(71) Applicant: SanDisk Technologies Inc., Plano, TX (US)

(72) Inventor: Gary Lin, San Jose, CA (US)

(73) Assignee: SanDisk Technologies LLC, Plano, TX (US)

( * ) Notice: Subject to any disclaimer, the term of this patent is extended or adjusted under 35 U.S.C. 154(b) by 194 days.

(21) Appl. No.: 14/079,371

(22) Filed: Nov. 13, 2013

(65) Prior Publication Data

US 2015/0134882 A1 May 14, 2015

(51) Int. Cl.
*G06F 3/06* (2006.01)

(52) U.S. Cl.
CPC ............ *G06F 3/0679* (2013.01); *G06F 3/0613* (2013.01); *G06F 3/0656* (2013.01); *G06F 3/0659* (2013.01)

(58) Field of Classification Search
CPC ... G06F 3/0604; G06F 3/0655; G06F 3/0679; G06F 3/0613; G06F 3/0656; G06F 3/0659
See application file for complete search history.

(56) References Cited

U.S. PATENT DOCUMENTS

| | | | |
|---|---|---|---|
| 6,904,511 B2 | 6/2005 | Hokenek et al. | |
| 7,293,153 B2 * | 11/2007 | Vu | G06F 13/404 710/11 |
| 8,347,312 B2 | 1/2013 | May et al. | |
| 2002/0103990 A1 | 8/2002 | Potash | |
| 2003/0078954 A1 | 4/2003 | Haughey | |
| 2003/0079094 A1 | 4/2003 | Rajwar et al. | |
| 2004/0215946 A1 | 10/2004 | Kalla et al. | |
| 2006/0012603 A1 | 1/2006 | Lindholm et al. | |
| 2007/0136549 A1 * | 6/2007 | Kawamura | G06F 13/387 711/170 |
| 2008/0001958 A1 | 1/2008 | Vembu et al. | |
| 2008/0270678 A1 | 10/2008 | Cornwell et al. | |

(Continued)

FOREIGN PATENT DOCUMENTS

| | | |
|---|---|---|
| EP | 1 675 014 A1 | 12/2005 |
| EP | 1 855 181 A2 | 2/2007 |

(Continued)

OTHER PUBLICATIONS

International Search Report and Written Opinion of the International Searching Authority issued Mar. 6, 2015 for PCT Application No. PCT/US2014/065350 (13 pp.).

*Primary Examiner* — Hashem Farrokh
(74) *Attorney, Agent, or Firm* — Brinks Gilson & Lione

(57) ABSTRACT

Systems and methods implemented therein are disclosed for communicating data between a memory controller and a first flash device. The system comprises a memory controller having a flash interface module. The memory controller is adapted to be communicatively coupled to a host system. The memory controller configured to receive a template. The template comprises a first set of resources for communicating data between the memory controller and the flash device and based on the template. The memory controller is adapted to configure the first set of resources for communicating data between the memory controller and the first flash device. The flash interface module is communicatively coupled to the memory controller. The flash interface module is configured to communicate data between the memory controller and the first flash device via the first set of resources.

16 Claims, 13 Drawing Sheets

(56) References Cited

U.S. PATENT DOCUMENTS

| | | |
|---|---|---|
| 2009/0077305 A1* | 3/2009 | Shin .................. G06F 13/1668 711/103 |
| 2010/0088469 A1* | 4/2010 | Motonaga ............ G06F 3/0613 711/113 |
| 2011/0113220 A1 | 5/2011 | Morishita |
| 2011/0131346 A1 | 6/2011 | Noeldner et al. |
| 2011/0173403 A1 | 7/2011 | Gara et al. |
| 2012/0166682 A1 | 6/2012 | Chang et al. |
| 2014/0244907 A1* | 8/2014 | Watanabe ............ G06F 3/0613 711/103 |

FOREIGN PATENT DOCUMENTS

| | | |
|---|---|---|
| JP | 2011081695 A | 4/2011 |
| KR | 20110064360 A | 6/2011 |
| WO | 2004/034209 A2 | 4/2004 |
| WO | 2008/055099 A2 | 5/2008 |

* cited by examiner

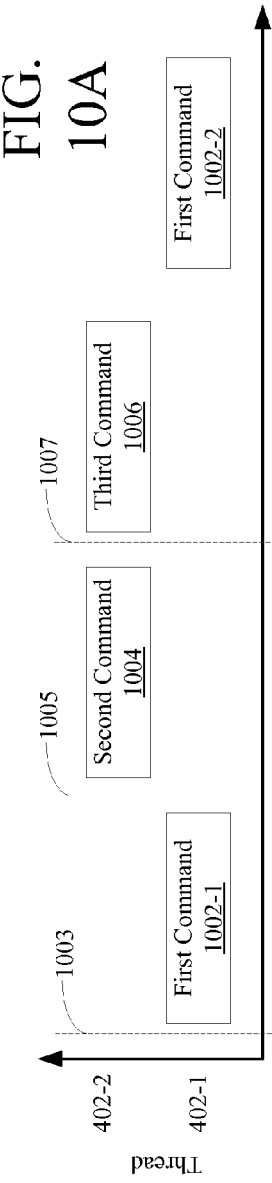
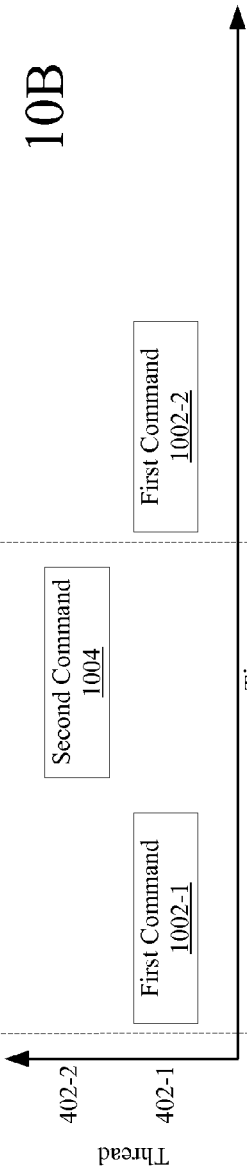
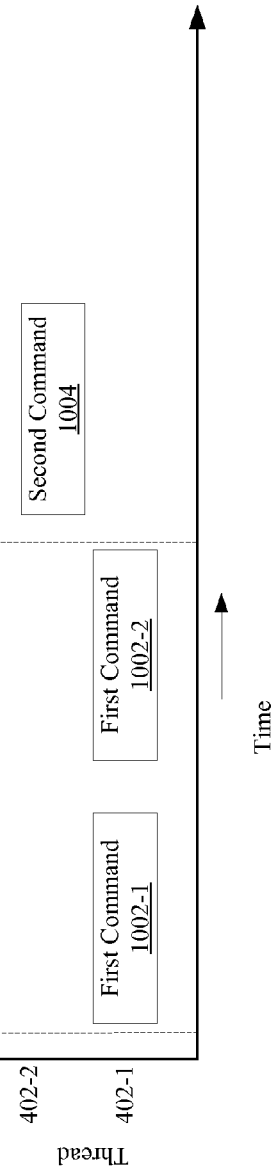
FIG. 10A
FIG. 10B
FIG. 10C

METHOD AND SYSTEM FOR USING TEMPLATES TO COMMUNICATE WITH NON-VOLATILE MEMORY

TECHNICAL FIELD

This application relates generally to managing data in a memory system. More specifically, this application relates to the operation of a memory system to improve parallelism in communicating with re-programmable non-volatile semiconductor flash memory having multiple die or banks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Sophisticated operating systems (OS) power both general purpose computers and special purpose devices like digital cameras, scanners, etc. One of the often touted advantages of an OS is that it allows a user to use multiple software applications concurrently. Frequently, these software applications access hardware components that are connected to the processor of the device via a hardware interface. Depending on the system architecture, hardware components may share a common hardware interface. A hardware interface may include a PCI bus, a USB bus, an ISA bus, an ATAPI bus and/or any proprietary interface that allows multiple hardware components to communicate via the hardware interface with a processor. An access to a hardware component via the hardware interface may consume a finite amount of time depending on the type of access. For purposes of this discussion, hardware components include flash memory, compact flash, printers, scanners, hard drives, DVDs, CDs, USB memory sticks, etc. For the duration of the access, other software applications are sometimes locked out from accessing other hardware components connected to the hardware interface. This is undesirable if another application needs to access another hardware component to perform a time-critical operation. It may be desirable to share the common hardware interface between several applications in an ordered and configurable fashion.

Separately, the amount of data transferred between a software application and a hardware component depends on the type of access. For example, a status check of a hardware component may only consume a small amount of time. In contrast, transferring a file comprising several megabytes of data may consume a larger amount of time. Accesses that are time intensive may be speeded up by deploying available hardware resources to the access. It may be desirable to allocate hardware resources to an access based on a metric that quantifies or qualifies the type of access. If such allocation (and de-allocation) is performed in a flexible, transparent manner, scarce and finite hardware resources may be judiciously utilized to optimize the operation of a system, in general.

SUMMARY

In order to address the need for improved memory management in a multi-bank and/or multi-die memory system, methods and systems are disclosed herein for achieving parallelism in communicating with flash banks.

According to one aspect, a method of communicating data in a flash memory system is disclosed. In one embodiment, the flash memory system comprises a memory controller and a flash device. The flash memory system receives a first template comprising a first set of resources for communicating data between the memory controller and the first flash device. Based on the first template, the flash memory system configures the first set of resources for communicating data between the memory controller and the first flash device. In accordance with the method the flash memory system causes data to be communicated between the memory controller and the first flash device via the first set of resources. In response to receiving a second template comprising a second set of resources for communicating data between the memory controller and the first flash device, the flash memory system, based on the second template, configures the second set of resources for communicating data between the memory controller and the first flash device. Finally, the flash memory system causes data to be communicated between the memory controller and the first flash device via the second set of resources.

According to another aspect, a system for communicating with a flash device is disclosed. The system comprises a memory controller having a flash interface module. The memory controller being adapted to be communicatively coupled to a host system. The memory controller configured to receive a template. The template comprises a first set of resources for communicating data between the memory controller and the flash device based on the template. The memory controller is adapted to configure the first set of resources for communicating data between the memory controller and the first flash device. Finally, the flash interface module is communicatively coupled to the memory controller. The flash interface module is configured to communicate data between the memory controller and the first flash device via the first set of resources.

Other features and advantages will become apparent upon review of the following drawings, detailed description and claims. Additionally, other embodiments are disclosed, and each of the embodiments can be used alone or together in combination. The embodiments will now be described with reference to the attached drawings.

BRIEF DESCRIPTION OF THE DRAWINGS

FIGS. 10A-C are timing diagrams that illustrate communication of command sequences under different scenarios.

DETAILED DESCRIPTION

Methods described herein may allow a host system to communicate simultaneously with two or more hardware components via a common hardware interface. Frequently, communicating with hardware components requires the transmission and reception of commands. For example, communicating with a flash device requires communicating flash command. A flash command may comprise several atomic portions. Generally, the communication of an atomic portion cannot be interrupted, while the communication of different atomic portions of a command can be interrupted. Thus, a flash command may be translated into a command sequence wherein the command sequence consists of a series of atomic portions that are separable thereby allowing for the independent communication of each of the portions. After communicating a first atomic portion of a multi-atomic portion command sequence to a first hardware component, methods described herein may selectively communicate another atomic portion from another command sequence to a second hardware component while waiting for the first hardware component to perform the function associated with the first atomic portion. This allows command sequences to be interleaved on a common interface. Although methods described herein are explained with reference to a memory system, the methods are equally applicable to other systems that include interfaces shared between two or more hardware components.

In contrast to mere interleaving of data on a data bus, apparatus and methods described herein not only facilitate the transmission via a common interface of a first portion of a multi-portion command sequence to a first flash device followed by the transmission of a command sequence to a second flash device before transmitting a second portion of the multi-portion command sequence to a first flash device, but also facilitate dynamically altering the priorities at which the different command sequences are transmitted to the first and second flash device. Thus, a lower priority multi-portion command sequence may be preempted or interrupted by a higher priority command sequence.

Figure 1:
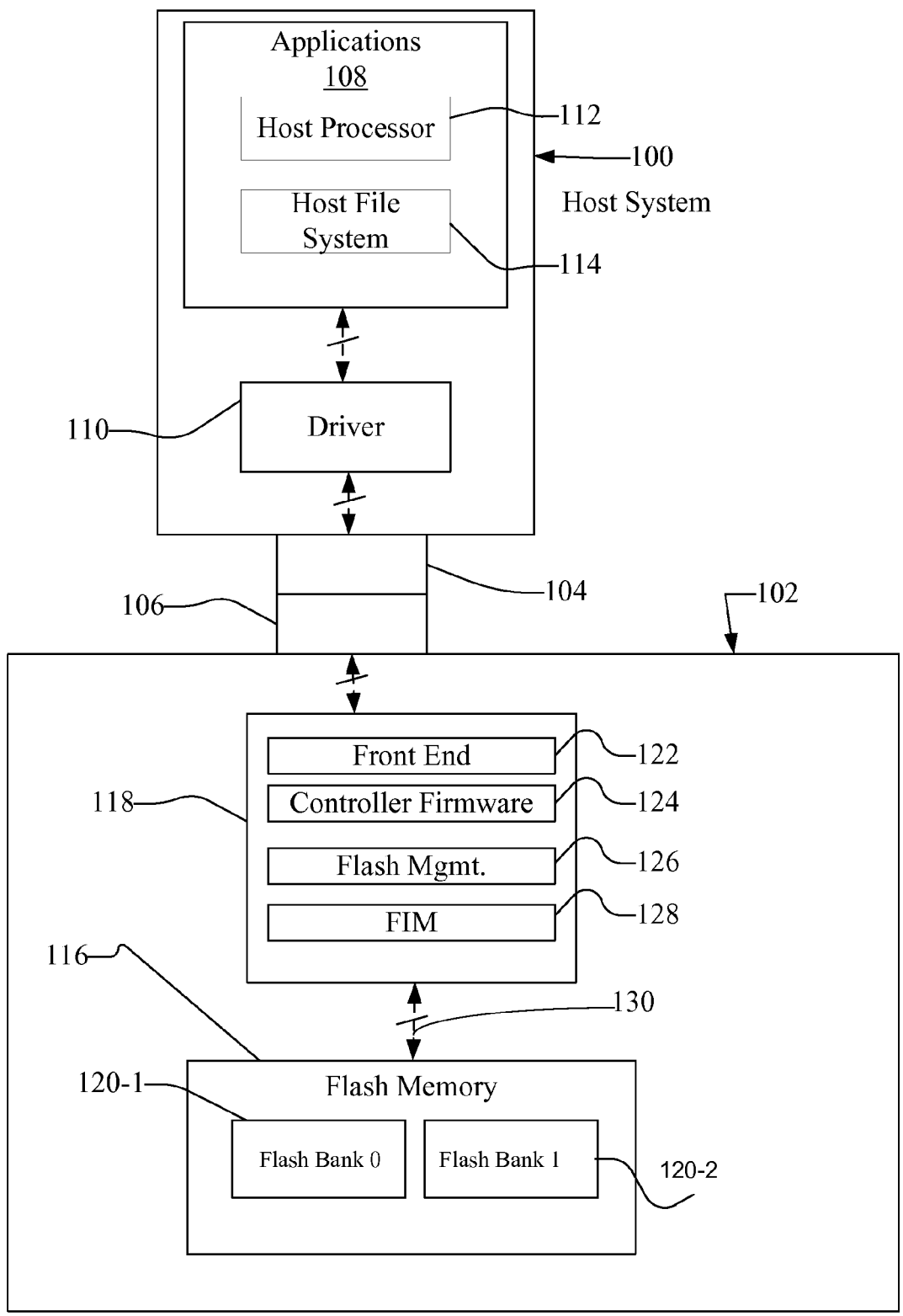
FIG. 1 illustrates a host connected with a memory system having a multi-bank non-volatile memory containing multiple flash banks.

A flash memory system suitable for use in implementing aspects of the invention is shown in FIG. 1. A host system 100 of FIG. 1 stores data into and retrieves data from a memory system 102. The memory system may be flash memory embedded within the host, such as in the form of a solid state disk (SSD) drive installed in a personal computer. Alternatively, the memory system 102 may be in the form of a card that is removably connected to the host through mating parts 104 and 106 of a mechanical and electrical connector as illustrated in FIG. 1. A flash memory configured for use as an internal or embedded SSD drive may look similar to the schematic of FIG. 1, with the primary difference being the location of the memory system 102 internal to the host. SSD drives may be in the form of discrete modules that are drop-in replacements for rotating magnetic disk drives.

The host system 100 of FIG. 1 may be viewed as having two major parts, insofar as the memory system 102 is concerned, made up of a combination of circuitry and software. They are an applications portion 108 and a driver portion 110 that interfaces with the memory system 102. In a PC, for example, the applications portion 108 can include a host processor 112 running word processing, graphics, control or other popular application software, as well as the file system 114 for managing data on the host system 100. In a camera, cellular telephone or other host system that is primarily dedicated to performing a single set of functions, the applications portion 108 includes the software that operates the camera to take and store pictures, the cellular telephone to make and receive calls, and the like.

The memory system 102 of FIG. 1 may include non-volatile memory, such as flash memory 116, and a memory controller 118 that both interfaces with the host 100 to which the memory system 102 is connected for passing data back and forth and controls the memory 116. The memory controller 118 may convert between logical addresses of data used by the host 100 and physical addresses of the flash memory 116 during data programming and reading. The flash memory 116 may include any number of flash memory banks 120 and two flash memory banks 120-1 120-2 are shown in FIG. 1 simply by way of illustration. By way of example and without limitation the term flash memory bank is used to describe 120-1 120-2. However, 120-1 120-2 may also correspond to flash dies in the same package. Functionally, the memory controller 118 may include a front end 122 that interfaces with the host system, controller logic 124 for coordinating operation of the memory 116, flash management logic 126 for internal memory management operations such as garbage collection, and one or more multi-threaded flash interface modules (FIMs) 128 to provide a communication interface between the controller with the flash memory 116.

Figure 2:
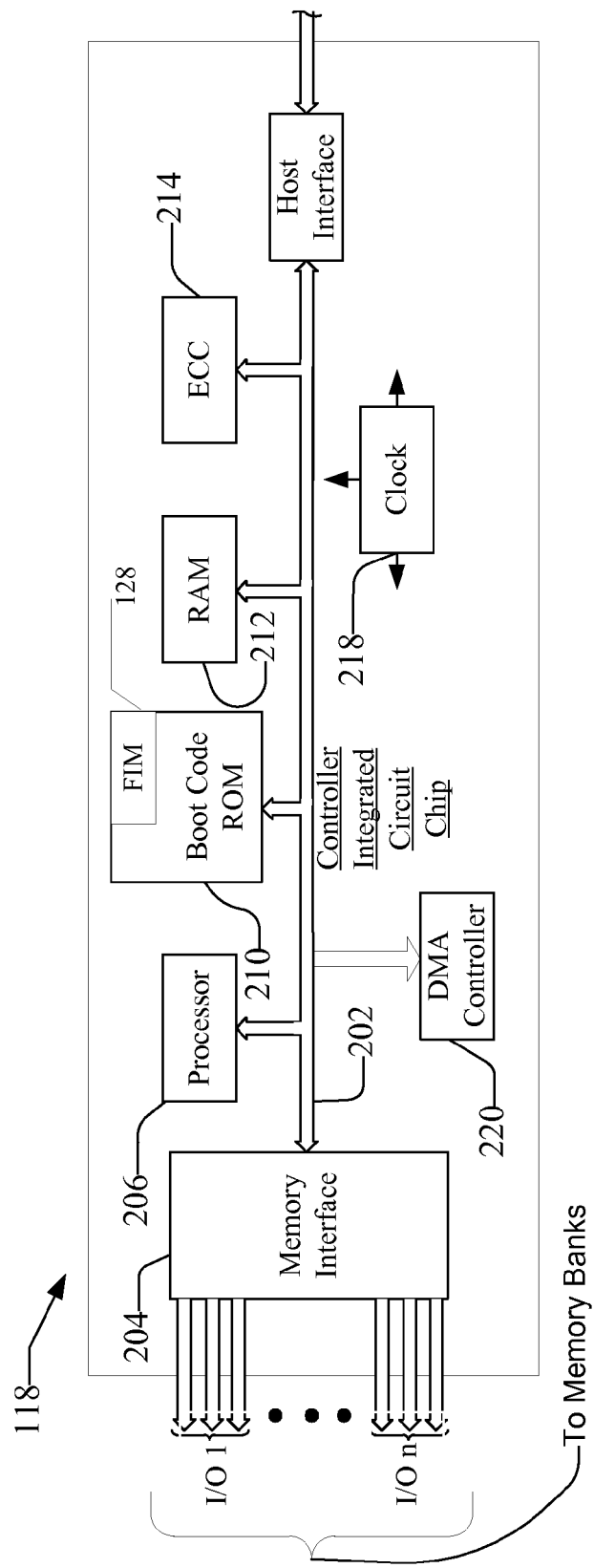
FIG. 2 is an example block diagram of an example memory controller of FIG. 1 that communication in with the multiple flash banks of FIG. 1.

The memory controller 118 may be implemented on a single integrated circuit chip, such as an application specific integrated circuit (ASIC) such as shown in FIG. 2. The processor 206 of the memory controller 118 may be configured as a multi-thread processor capable of communicating with each of the respective memory banks 120-1 120-2 via a memory interface 204 having a single I/O ports for flash banks 120-1 and 120-2 in the flash memory 116. The memory controller 118 may include an internal clock 218. The processor 206 communicates with direct memory access (DMA) controller 218, an error correction code (ECC) module 214, a RAM 212, a host interface 216, and boot code ROM 210 via an internal data bus 202.

By way of example, flash interface module 128 may be stored as software instructions in boot code ROM 210. The processor 206 may execute the software instructions to enable the parallel communication with flash bank 120-1 and 120-2 of FIG. 1. Separately, as will be discussed in detail later, flash interface module 128 may configure DMA controller 220 to create one or more logical data paths (not shown) between flash banks 120-1 and 120-2 and RAM 212. The logical data paths may be used to communicate data between flash banks 120-1 and 120-2 and RAM 212 concurrently or simultaneously via common memory interface 204.

The memory controller 118 may receive commands from the host system 100. Commands may include data read requests, data write requests, format requests and sector erase requests. For example, an application may request from the host file system 114 a file stored in flash memory 116. In response to the request driver 110 may generate and communicate a read request to the memory system 102.

Figure 3:
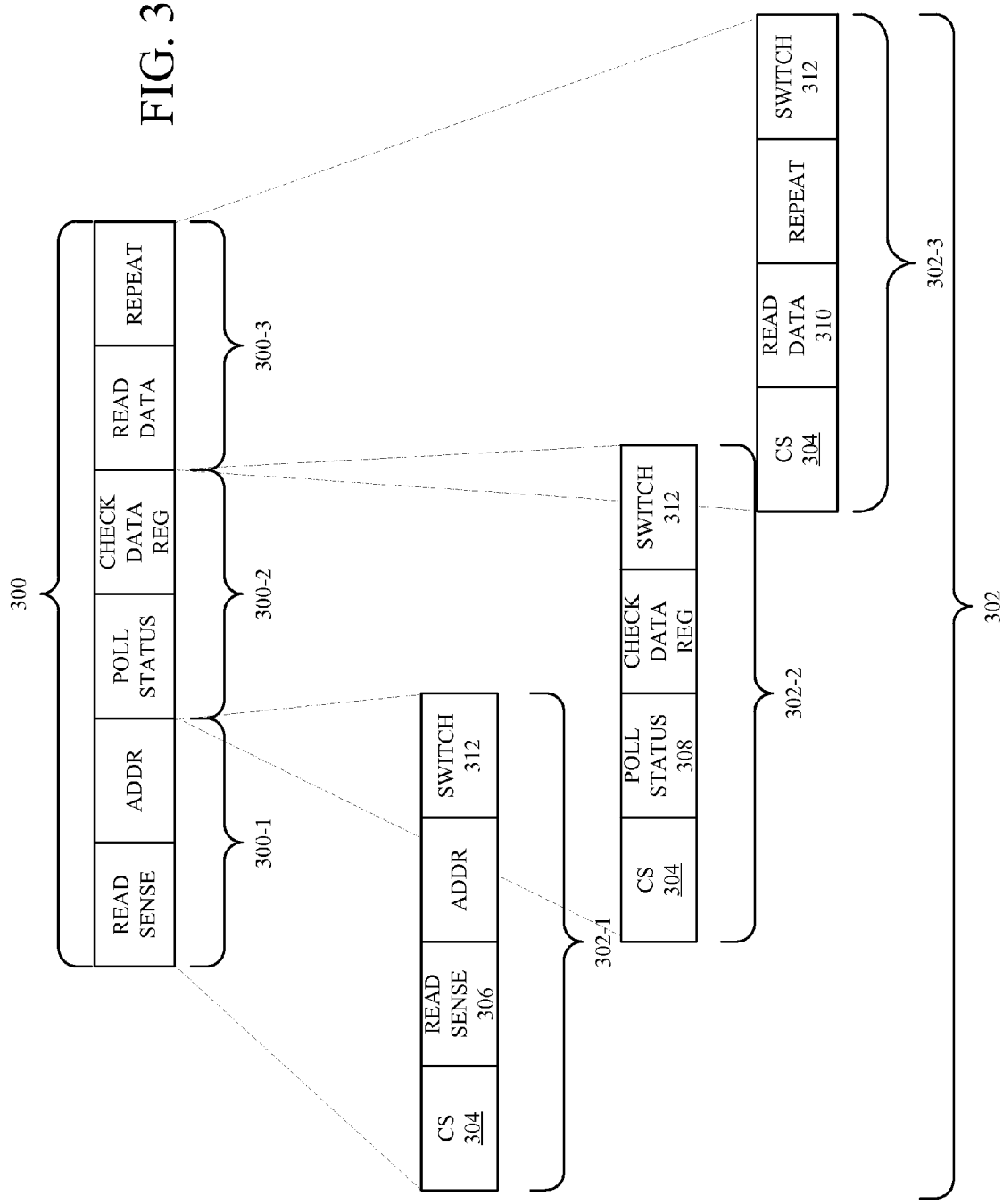
FIG. 3 is a representation of an example flash command and the corresponding command sequence that may be generated by elements of a flash interface module.

FIG. 3 illustrates an example read request command 300 that may be received by the memory system 102 from the host system 100. The read request command 300 comprises a read sense sequence 300-1, a read status sequence 300-2, and a data transmit sequence 300-3. Each of the sequences comprises a combination of flash commands and data. As previously discussed, the process of carrying out the steps in a sequence is non-interruptible and such a sequence is referred to an atomic sequence.

In an embodiment, flash interface module 128 translates the read request command 300 into three separate atomic sequences or portions 302-1 302-2 302-3 to generate the command sequence 302. To generate the command sequence 302, flash interface module 128 adds a chip select sequence 304 as a prefix to each of the portions 300-1, 300-2 and 300-3 and terminates each of the portions 300-1, 300-2 and 300-3 with a pre-defined command or switch instruction 312. The chip select sequence 304 identifies one of the flash banks 120-1, 120-2. Based on the chip select sequence 304, a flash bank determines if the commands and data following the chip select sequence 304 are intended for it.

As will be discussed in greater detail below, using the format of the command sequence 302, methods implemented in flash interface module 128 of memory controller 118 may communicate portions of another command sequence to flash memory 116 between communicating portions 302-2 and 302-3, for example, thereby enabling simultaneous or parallel communication between the memory controller 118 and the different flash banks 120-1 and 120-2 via the single memory interface 204. Although the foregoing discussion references the read request command 300, the memory system 102 is capable of translating any flash command into one or more atomic sequences or portions based on the particular flash command.

Figure 4:
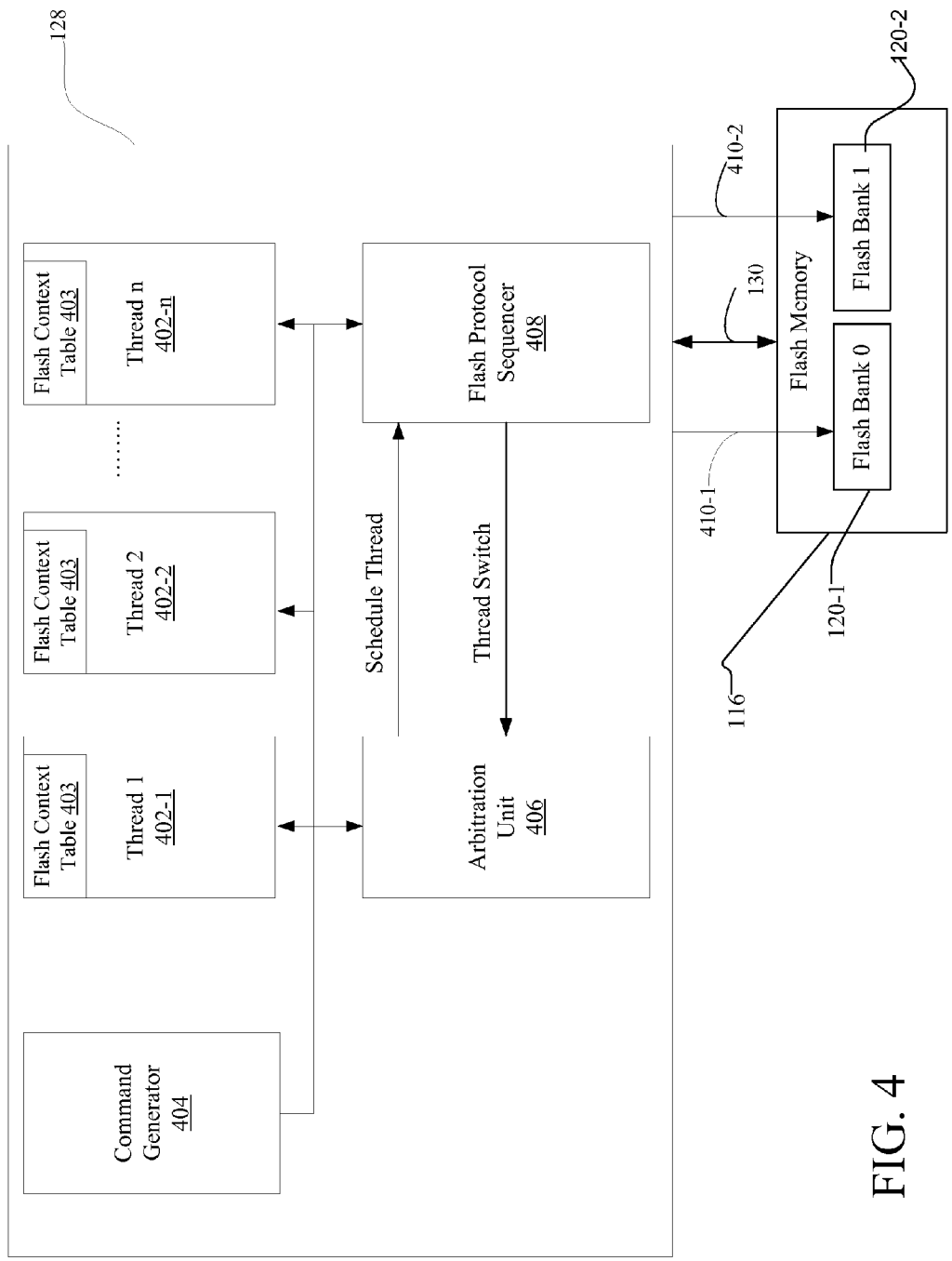
FIG. 4 is a block diagram of an example flash interface module that enables parallel communication between the memory controller and the multiple flash banks of FIG. 1.

The foregoing disclosure provides only one example format for a command sequence. A person of ordinary skill in the art will recognize that it is possible to generate command sequences having different formats that still comply with the requirement of generating atomic portions of command sequences FIG. 4 is a block diagram of an example flash interface module 128 that enables simultaneous or parallel communication between the memory controller 118 and flash banks 120-1 and 120-2 via the single memory interface 204. Processor 210 may copy to and execute from RAM 212 instructions corresponding to flash interface module 128 after a power on reset, for example.

Flash interface module 128 comprises several threads 402-1, 402-2, . . . , 402-N. Threads 402-1, 402-2, . . . , 402-N may be created during initialization of the memory system 102 as will be discussed in detail later. Generally, a thread is a series of software instructions that may be executed by a processor. Within the context of an operating system, a thread is a software object that may be conditionally executed by a scheduler of the operating system. In the discussion that follows, threads 402-1, 402-2, . . . , 402-N may execute command sequences while the threads are executed by the processor. In one embodiment, flash interface module 128 may create the above referenced threads. In another embodiment, host system 100 may instruct flash interface module 128 to create the threads. Memory system 102 utilizes the thread associated with a flash bank to communicate with that particular flash bank. In the upcoming discussion thread 402-1 is associated with and used to communicate with flash bank 120-1, thread 402-2 is associated with and used to communicate flash bank 120-2 and so on. Generally, the threads 402-1 402-2 . . . 402-N are inactive after creation.

Threads may be assigned a priority when they are created. Generally, an active thread with a higher priority will be executed before an active thread with a lower priority. Data communication between the memory controller and the flash bank associated with the higher priority thread will take place before data communication between the host and the flash bank associated with the lower priority thread. In one scenario, host system 100 may communicate to memory system 102 the priority that is to be assigned to each of the threads. For example, host system 100 may instruct memory system 102 to create thread 402-1 with a higher priority than thread 402-2. In this scenario, host system 100 may selectively store high priority data in the flash bank 120-1 and low priority application data in flash bank 120-2. Because thread 402-1 is assigned a higher priority than thread 402-2 communication of high priority data will take place before or preempt or interrupt communication of low priority application data. Using method described below, the flash interface module 128 may switch between the several threads to enable parallel access to the different memory die via the single memory interface 204.

Referring to the command sequence 302 of FIG. 3, flash interface module 128 may assign the command sequence 302 a priority. In another embodiment, the host system 100 may assign a priority to the read request command 300. In this embodiment, flash interface module 128 may associate the priority with the generated command sequence 302. In another embodiment, the priority of a thread may be adjusted whenever a new command sequence is received by the thread. In this embodiment, a command sequence may be assigned a priority and the priority of the command sequence may be temporarily assigned to the corresponding thread while that command sequence is being communicated. Thus, certain urgent or time critical commands may be communicated to a flash bank at a high priority even though the thread associated with that flash bank was created with a low priority.

Each thread 402-1, . . . , 402-N includes a flash context table (FCT) 403. FCT 403 includes information corresponding to the state of the corresponding thread and resources currently in use by the thread. For example, FCT 403 includes data storage that a thread may use to store the current state of the thread (e.g., active, inactive, etc.), the priority assigned to the thread, the command sequence being executed, configuration information for the logical data paths being used to communicate data between RAM 212 and the flash bank associated with the thread, etc.

In an embodiment, the flash interface module 128 includes command generator 404, arbitration unit 406 and flash protocol sequencer 408. Command generator 404, arbitration unit 406 and flash protocol sequencer 408 may correspond to hardware, firmware or software elements. In some situations, design considerations may warrant a hybrid approach wherein some portions of the flash interface module 128 are implemented in hardware and the remaining portions are implemented as firmware or software instructions that may be executed by processor 206 of FIG. 2. In an embodiment, command generator 404 performs the steps required to translate a flash command to a command sequence. For example, the command generator 404 in response to receiving read request command 300 of FIG. 3 generates the command sequence 302. The command generator 404 communicates the generated command sequence to the appropriate thread. The command generator 404 may also activate the appropriate thread after communicating the command sequence.

In an embodiment, arbitration unit 406 comprises instructions that detect if any of the threads 402-1, . . . , 402-N are active. In this embodiment, arbitration unit may scan the state of the threads 402-1, ..., 402-N. For example, arbitration unit 406 may interrogate or query the FCT 403 of each of the threads 402-1 ... 402-N to identify the active state of the respective threads. Arbitration unit 406 schedules the execution of an active thread. In a scenario where more than one thread is active, arbitration unit 406 may schedule the execution of a thread with a higher priority. In another scenario when two threads having the same priority are active, arbitration unit 406 may "round robin" or time slice or time division multiplex the execution of the two active threads. Generally, a round robin scheme implies that software objects like threads, tasks or software functions having the same priority are allowed to execute sequentially. In essence, arbitration unit 406 slices execution of the different software objects. For example, if threads 402-1 and 402-2 have the same priority, and as long as both threads are active, arbitration unit 406 will switch or alternate execution of threads 402-1 and 402-2.

In an embodiment, in addition to the priority of the thread, the command sequence being executed by each thread may be associated with a sequence priority. In this embodiment, arbitration unit 406 may generate a total thread priority for each thread. The total priority of a thread may correspond to the sequence priority of the command associated with the respective thread and the priority of the thread. Arbitration unit 406 may cause the execution of the command sequence associated with the thread having the highest total priority. In one example, generating a total thread priority for a thread may include scaling the sequence priority of the command sequence associated with the thread by the total number of threads. The result of this scaling operation may be added to the priority of the thread to generate a total thread priority for the particular thread.

Arbitration unit 406 may be communicatively coupled to flash protocol sequencer 406. Communication between arbitration unit 406 and flash protocol sequencer 408 may take place using callouts, interrupts, queues, semaphores etc. In an embodiment, arbitration unit 406 may schedule the execution of an active thread by communicating an indication of the active thread. For example, arbitration unit 406 may communicate a reference to the FCT of the active thread, in an embodiment. The arbitration unit 406 may also be configured to adjust the priority of a thread after a portion of a command sequence has been communicated to a flash bank.

Flash protocol sequencer 408 is configured to execute the instructions and command sequence associated with the thread that is scheduled to execute. On receiving a reference to a thread, flash protocol sequencer 408 may retrieve the context of the thread from the FCT 403 of the thread. Flash protocol sequencer 408 may sequentially perform the steps of a command sequence associated with the thread. Referring to command sequence 302 of FIG. 3 as an example, in an embodiment, flash protocol sequencer 408 may sequentially perform the steps associated with the command sequence 302 including activating circuitry to select the flash bank corresponding to chip select field 304 or transmitting a flash ID corresponding to chip select field 304, communicating commands 306 308 310 to the selected flash bank, and checking status registers associated with the selected flash bank. On detecting a switch instruction 312, flash protocol sequencer 408 may transmit a thread switch indication to arbitration unit 406 and suspend operation. Before suspending operation, flash protocol sequencer 408 may store the context of thread in the FCT of the thread.

Although in the foregoing discussion, threads are utilized to communicate command sequences between memory controller 118 and flash banks 120-1 and 120-2, for example, in other embodiments instead of threads, other appropriate data structures may be utilized to store a command sequence, the command associated priority information, allocated resources etc. An array of such data structures may be used instead of threads. For example, entry zero of the data structure may be associated with flash bank 120-1, entry one may be associated with flash bank 120-2 and so on. In these embodiments, the data structure may be scanned to identify a command sequence with the highest priority. A null in an entry of the data structure may indicate that there are no command sequences to be communicated to the flash bank corresponding to that entry. A data structure entry may also include a reference to the portion of a command sequence associated with that entry that needs to be communicated. For example, referring to FIG. 3, if 302-1 was the portion that was previously communicated to a flash bank, the entry in the data structure associated with command sequence 302 may include a reference to portion 302-2. Such a data structure is useful in scenarios when an operating system is not employed.

Figure 5:
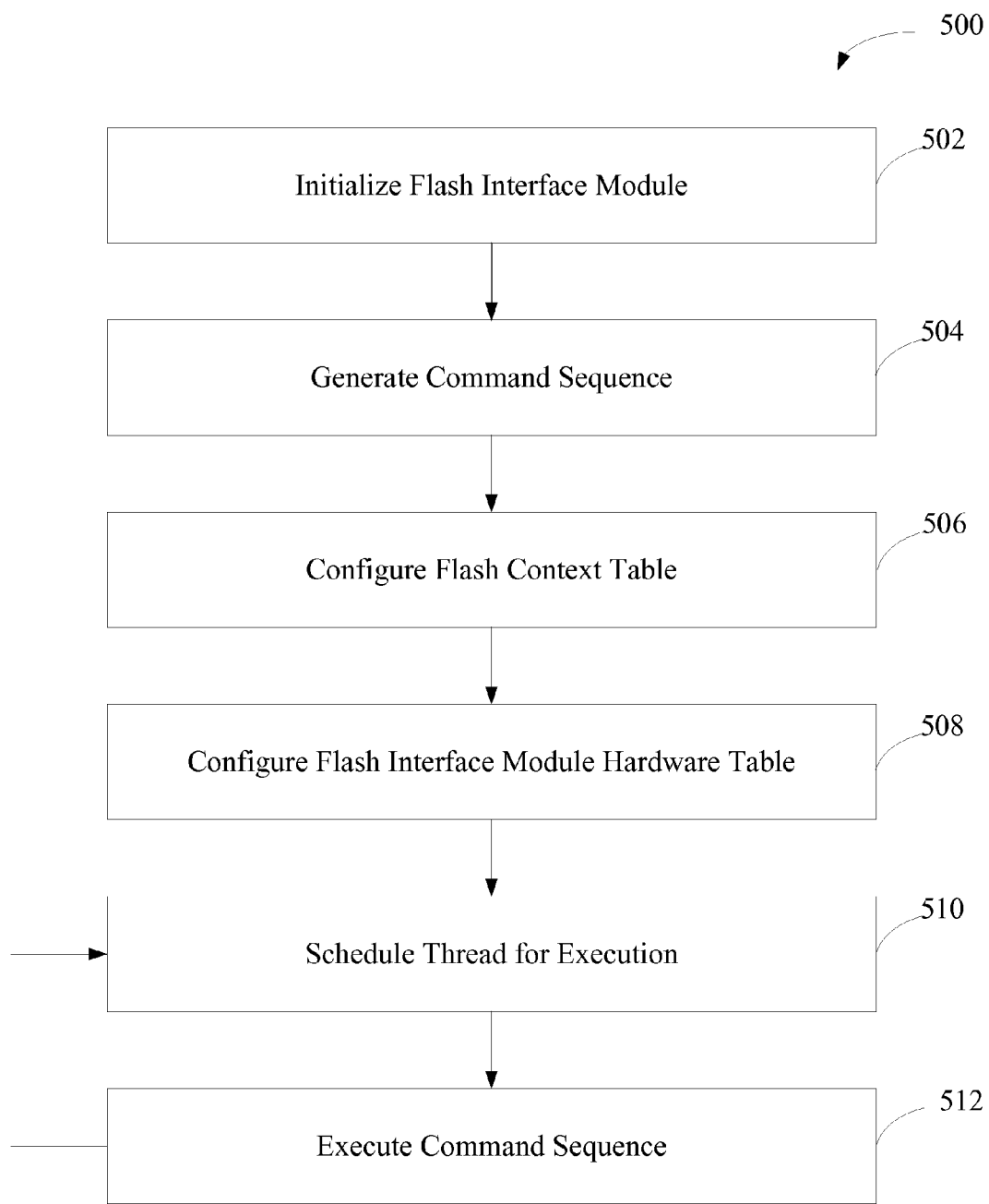
FIG. 5 is a flow diagram of an example method implemented in flash interface module of FIG. 1.

FIG. 5 is a high-level flow diagram of an example method 500 that may be implemented in flash interface module 128 to enable communication between host processor 112 and flash banks 120-1 and 120-2 in an embodiment. In this embodiment, functionality ascribed to each of the blocks of example method 500 may be implemented in command generator 404, arbitration unit 406 and flash protocol sequencer 408.

At block 502, portions of memory controller 118 may initialize flash interface module 128. In an embodiment, processor 206 may execute software instructions stored in boot code ROM 210 to instantiate flash interface module 128 and copy flash interface module 128 to RAM 212. In this embodiment, processor 206 may detect the number of flash banks in flash memory 116. In response to detecting the number of flash banks, a corresponding number of flash interface threads 402-1, ..., 402-N may be created or spawned and a flash interface thread may be associated with a corresponding flash bank. In an embodiment, at block 502, a real-time operating system (RTOS) (not shown) may be invoked to create threads 402-1 402-2 ... 402-N. Separately, at block 502, the threads may be assigned a priority when they are created. In some embodiments, the threads are assigned the same priority. In other embodiments, memory controller 118 may receive the desired thread priorities from driver 110. The threads may remain in an inactive state after creation. In embodiments where the previously described data structure is used in the place of threads, at block 502, the data structure may be appropriately initialized.

At block 504, flash interface module 128 may receive one or more flash commands from driver 110. Each flash command may include a reference to the identity of a flash bank. Based on the identity, flash interface module 128 may determine a chip select or chip ID of the flash bank associated with the flash commands. Separately, at block 504, command generator 404 may generate a command sequence from a flash command. The process of generating a command sequence has been previously discussed with respect to FIG. 3. Based on the identity of the flash bank, command generator 404 may communicate the generated command sequence to the thread associated with the flash bank. In some embodiments, command generator 404 may receive a new priority that is to be assigned to the thread associated with the flash bank when executing the command sequence. The new priority may be different from the priority assigned to the thread at block 504. At block 504, command generator 404 may reassign the thread the new priority.

In some embodiments, based on the flash command, command generator 404 may identify and configure software and hardware resources that may be utilized to communicate data in response to a command sequence between the host system 100 and flash memory 116. Examples of hardware resources include logical data paths selected from the several logical data paths that may be available from DMA controller 220, timers (not shown) etc. Examples of software resources include semaphores, mutexes, queues, allocated memories from RAM 212 etc.

At block 506, to enable the thread to communicate the command sequence to a flash bank, the hardware resources allocated to the thread may be associated with the thread tasked with executing the command sequence by storing references to the hardware resources in the FCT of the thread. Separately, at block 506, the hardware resources themselves may be configured. This may include configuring interrupt controller, unmasking interrupts to generate an indication that a command sequence has been successfully communicated, clearing status and error registers etc.

At block 508, the FCT of the thread may be configured with a reference to the software resources allocated to the thread to enable communication of the command sequence. Storing references to software resources is particular useful because the software resources may be de-allocated after the command sequence that been communicated to a flash bank. Separately, at block 508, in one embodiment, the thread may be transitioned to the active state. In some embodiments, the thread may automatically transition to the active state on receiving a command sequence. In other embodiments, command generator 404 may force the transition of a thread to an active state after communicating a command sequence to a thread.

At block 510, elements of the flash interface module may identify a thread that has transitioned to the active. As will be discussed in greater detail below, in scenarios where two or more threads are active, the thread with a higher priority may be scheduled for execution. Scheduling a thread for execution may include transmitting an indication to flash protocol sequencer 408.

At block 512, in an embodiment, elements of the flash interface module 128 may execute the command sequence associated with a thread that was selected as execution. Before executing a command sequence, at block 512, the context of a thread may be restored from the FCT of the thread. Restoring the context may include restoring hardware registers of the processor 210 to their state when the thread was previously executed. This is particularly useful when a first portion of a command sequence was previously communicated before execution of the thread was interrupted in response to detecting a switch command and a second portion of the command sequence is getting ready to be communicated to a flash bank. At block 512, in response to detecting a switch command in the command sequence, execution of the thread may be suspended and the method may return to block 510 to schedule the execution of a higher priority active thread if such a thread exists. In instances where the last portion of a command sequence was communicated, at block 510, an indication may be generated to indicate completion of the command sequence.

Figure 6:
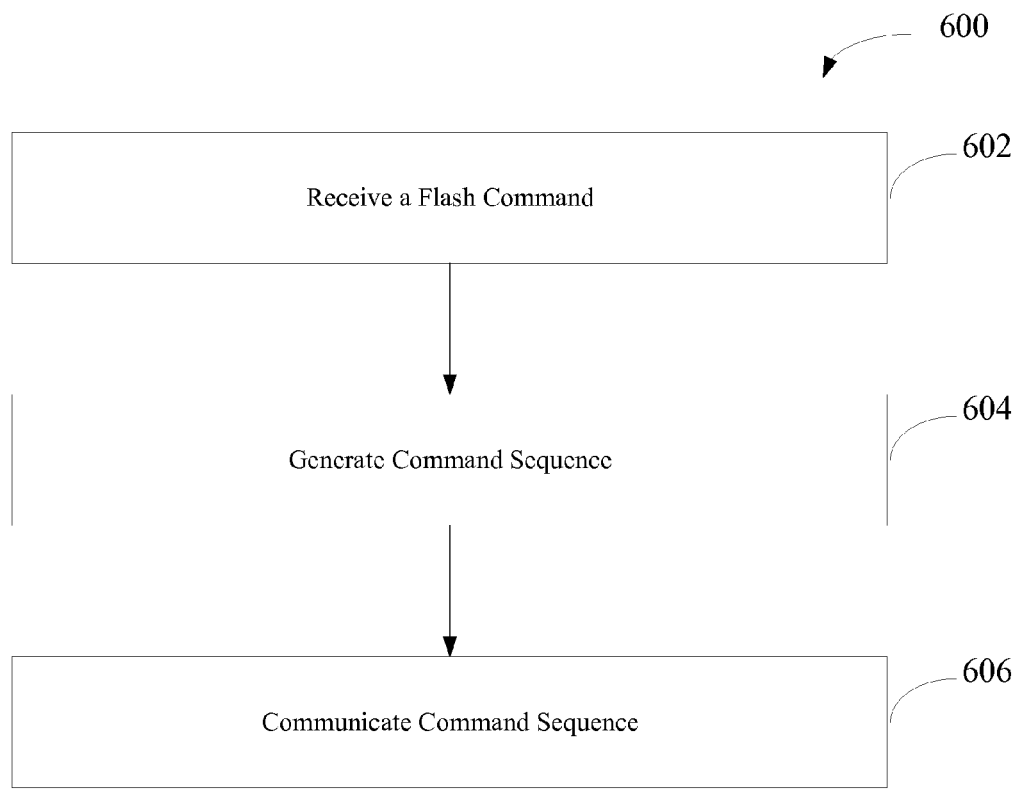
FIG. 6 is a flow diagram of an example command generator that may generate command sequences with several atomic portions.

FIG. 6 is a flow diagram of an example method 600 that may be implemented at command generator 404 of flash interface module 128, in accordance with an embodiment. At block 602, command generator 404 may receive a flash command from the memory controller 118. In an embodiment, at block 602, command generator 404 may also receive an identity of the flash bank that is the intended recipient of the flash command. Referring to FIG. 3, flash command 300 is an example flash command that may be received at block 602. At block 602, command generator 404 may also receive a priority associated with the flash command.

At block 604, command generator 404 may parse or analyze the received flash command to identify the commands and data in the flash command. With reference to FIG. 3, command generator 404 may identify read sense command 306, poll status command 308 and read data command 310 at block 604. Command generator 404 may be associated with a look-up table of all the valid commands that are supported by the flash memory 116. At block 604, command generator 404 may indicate an error condition if a command is not valid.

On detecting a valid flash command, at block 604, command generator 404 may generate a corresponding portion. For example, on detecting read sense command 306, command generator 404 may generate portion 302-1 at block 604. Command generator 404 may sequentially identify a command and its associated data and encapsulate the command and its associated data with chip select 304 and switch 312, in an embodiment. Chip select 304 may correspond to the identity of the flash bank that was received at block 602. In this manner, command generator 404 may generate command sequence 302, in an embodiment. Based on the flash command, at block 604, command generator 404 may determine that two consecutive commands, read sense 306 and poll status 308 for example, may be communicated as a single portion. In this situation, portion 302-1 may be generated without switch instruction 312. As a consequence, flash protocol sequencer 408 may communicate portions 302-1 and 302-2 consecutively.

At block 606, command generator 404 may transmit the generated command sequence to the thread associated with the received flash command. In the embodiment where a priority is received at block 602, at block 606 the thread associated with the received flash command may be assigned the priority. In other embodiments, command generator 404 may select an appropriate priority based on the command sequence and assign the selected priority to the thread.

Figure 7:
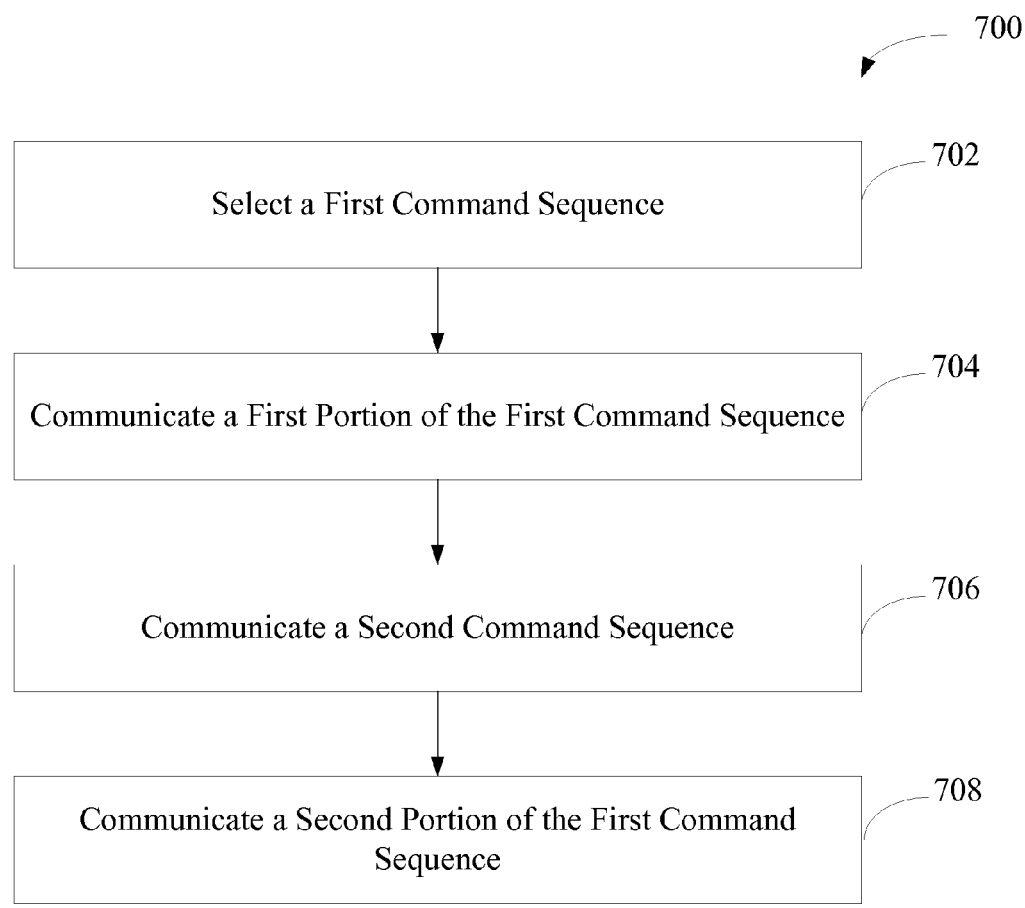
FIG. 7 is a flow diagram of an example flash protocol sequencer that may communicate portions of a command sequence via a common hardware interface.

FIG. 7 is a flow diagram of an example method 700 that may be implemented at flash interface module 128 to allow communication of portions command sequences to different flash banks via a common flash interface. At block 702, a first command sequence is selected. As previously explained the command sequence may be selected based on the priority associated with the first command sequence. In some embodiments, a command sequence may be associated with a thread and the thread may be associated with a flash bank as previously explained. In other embodiments, the command sequence may be stored in the previously discussed data structure.

At block 704, the identity of a flash bank may be determined by examining the command sequence. In response to determining the identity of the bank, the flash bank may be enabled by asserting the chip select signal associated with the flash bank. At block 704, a first portion of the selected command sequence is communicated to the identified flash bank. Separately, commands and data in the first portion of the selected command sequence may be communicated to the flash bank. It is noteworthy that the first portion of the command sequence is communicated via common flash interface. However only the flash bank whose chip select signal, for example, is asserted is responsive to the commands and data. On detecting a switch 312 in the command sequence, at block 704, an indication or signal may be generated to indicate completion of communication of the first portion. A pointer to the next portion of the command sequence may be stored in the data structure entry associated with selected command sequence in embodiments where data structures are used instead of threads.

At block 706, a second command sequence may be communicated to a second flash bank via the common flash interface. The second command sequence may be communicated in response to detecting a switch in the first portion of the first command sequence. The second command sequence may be selected because it has a higher priority that the first command sequence. In instances where the second command sequence has the same priority as the first command sequence, the second command sequence may nonetheless be selected for communication if a round robin scheme is utilized to select command sequences. At block 706, prior to communicating the second command sequence, the chip select of the first flash bank may be de-asserted before asserting the chip select of the second flash bank to avoid contention on the command flash interface. Although, the chip select of the first flash bank is de-asserted, a microcontroller (not shown) in the flash memory 116 may process the first portion of the first command sequence while the memory controller 118 is communicating the second command sequence to the second flash bank.

At block 708, a second portion of the first command sequence may be communicated to the first flash bank via the common flash interface. As previously explained, the chip select of the second flash bank may be de-asserted before the chip select of the first flash bank is asserted at block 708 to prevent contention.

Figure 8:
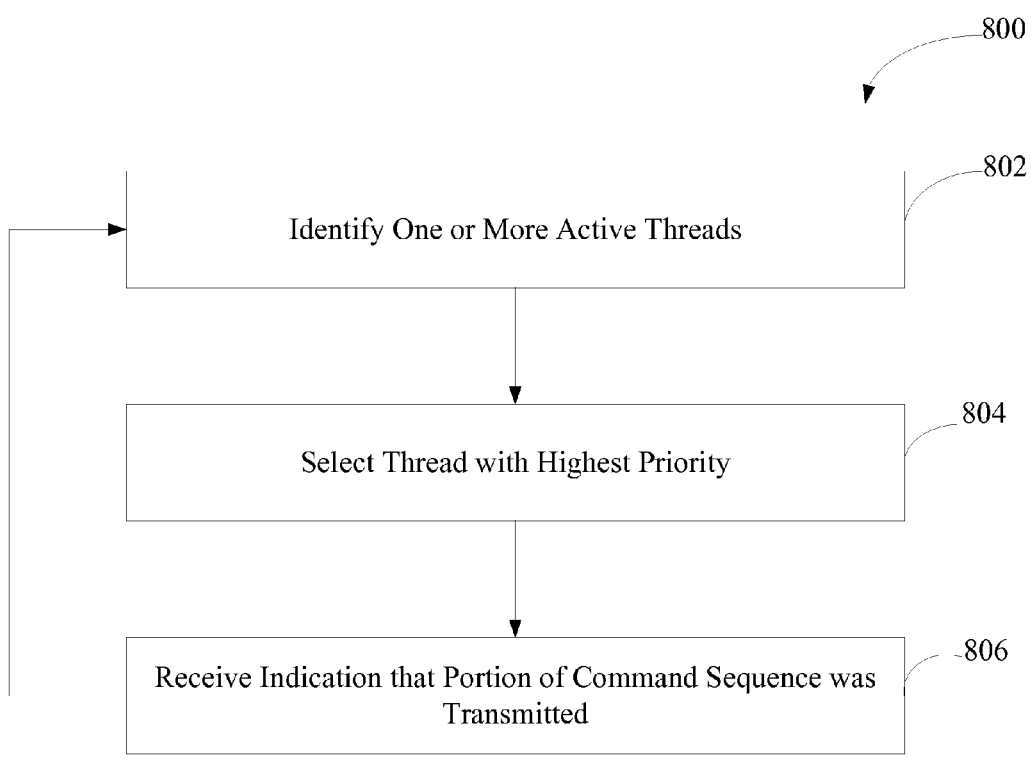
FIG. 8 is a flow diagram of an example arbitration unit that may select command sequences for communication.

FIG. 8 is a flow diagram of an example method 800 that may be implemented at arbitration unit 406 of FIG. 4. In an embodiment, at block 802 arbitration unit 406 may periodically query or interrogate the FCT 403 of threads 402-1, ..., 402-N to determine the state of each of threads 402-1 ... 402-N. In this embodiment, at block 802, arbitration unit 406 may receive an indication when a periodic timer expires. On receiving the indication, arbitration unit 406 may interrogate the state of threads 402-1, ..., 402-N. In another embodiment, at block 802, arbitration unit 406 may receive an indication from command generator 404 whenever command generator 404 communicates a command sequence to one of threads 402-1 ... 402-N.

In one scenario, arbitration unit 406 may detect two or more active threads at block 802. Such a scenario may arise when, for example, a first application from host system 100 initiates communication with flash bank 120-1 and substantially contemporaneously a second application from host system 100 initiates communication with flash bank 120-2. In this scenario, command generator 404 may generate a first command sequence and communicate the first command sequence to thread 402-1 and generate a second command sequence and communicate the second command sequence to thread 402-2 thereby causing threads 402-1 and 402-2 to transition to the active state.

As previously explained, each of threads 402-1, ..., 402-N may be associated with a respective priority. In response to detecting two or more active threads, by interrogating the FCT 403 of each of the threads for example, arbitration unit 406 may identify the priority of each of the active threads at block 804. On identifying the priorities of the active threads, at block 804, arbitration unit 406 may compare the priorities to select a thread with a higher or greater priority. In response, to detecting the thread with a higher priority, arbitration unit 406 may communicate a reference to the selected thread to flash protocol sequencer 408 at block 804. At block 804, arbitration unit 406 may enter a suspended state.

At block 806, arbitration unit 406 may receive an indication from flash protocol sequencer 408. The indication may be received in response to flash protocol sequencer 408 detecting a switch 312 command in a command sequence that flash protocol sequencer 408 communicated to a flash bank. The indication may correspond to the switch indication 312 of FIG. 3. In an embodiment, arbitration unit 406 may not enter a suspended state at block 804 but may instead poll thread switch indication to determine when flash protocol sequencer 408 communicated a portion of a command sequence.

In response to receiving a thread switch indication, arbitration unit 406 may, in one embodiment, decrement or adjust the priority of the thread associated with the command sequence that caused the generation of the thread switch indication by flash protocol sequencer 408 at block 806. Separately, arbitration unit 406 may repeat the sequence by branching to block 802. The priority may be adjusted according to an amount determined using any suitable mathematical formula.

Figure 9:
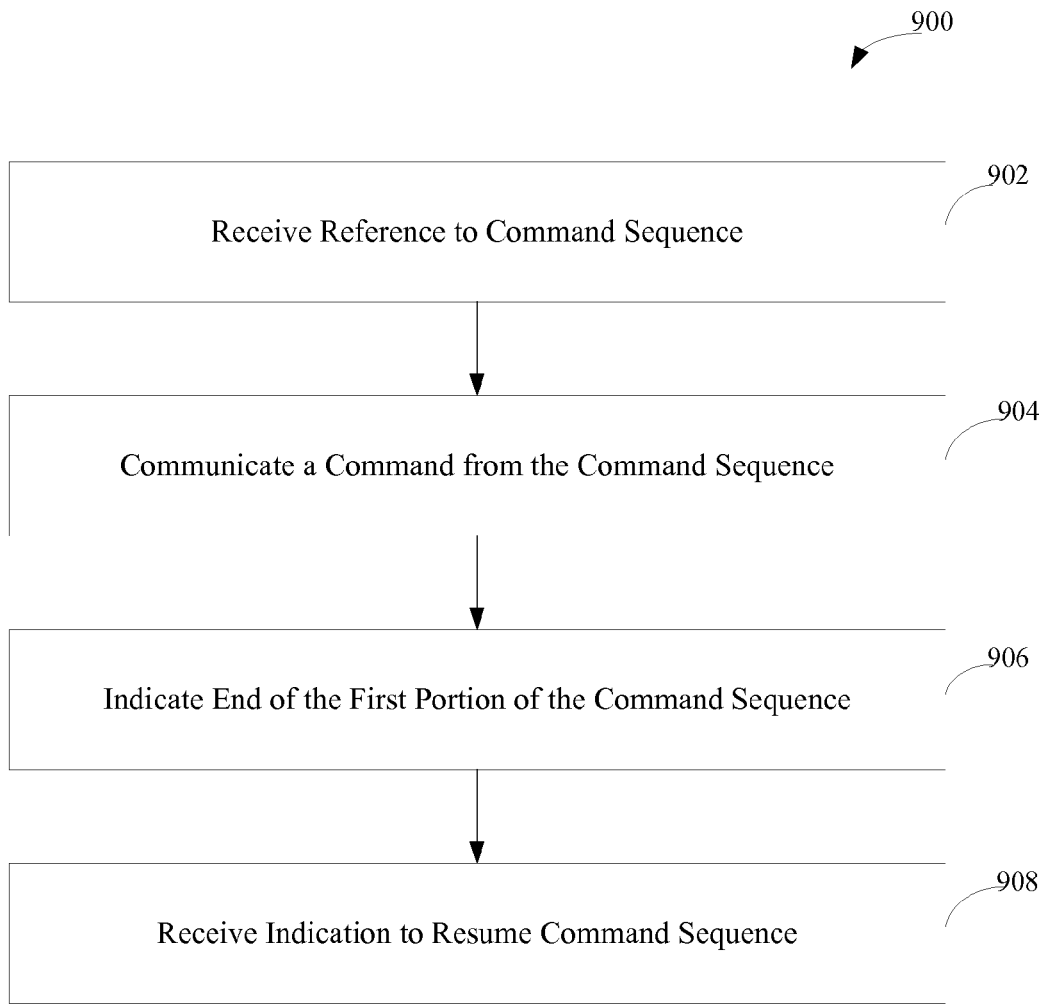
FIG. 9 is a flow diagram of another example flash protocol sequencer that may communicate portions of a command sequence via a common hardware interface.

FIG. 9 is a flow diagram of an example method 900 that may be implemented in flash protocol sequencer 408 of the flash interface module 128. The example method 900 describes the steps of communicating a single portion of a command sequence. For example, referring to FIG. 3, example method 900 describes the steps in communicating one of the portions 302-1, 320-2 or 302-3. At block 902, flash protocol sequencer 408 may receive a reference to a command sequence. As previously discussed, in scenarios where a data structure is used, the reference may include a pointer to the entry of the data structure associated with the command sequence. In embodiments where threads are employed, at block 902 a reference to the FCT of the thread associated with the command sequence may be received.

At block 904, flash protocol sequencer 408 may set up a context. Setting up the context may include restoring the state of processor 210 to its state when the thread was previously executed by flash protocol sequencer 408. For example, at block 804 general purpose and special purpose registers may be restored. The information used to restore the processor state may be retrieved from the FCT, in an embodiment. At block 904, flash protocol sequencer 408 may sequentially communicate commands and data from the first portion of the command sequence. Flash protocol sequencer 408 may also activate hardware to select the flash bank that is the intended recipient of the command sequence. In one implementation, flash protocol sequencer 408 may analyze the command sequence to determine the identity of the flash bank, at block 904. In implementations where the format of the command sequence described in FIG. 3 is used, flash protocol sequencer 408 may retrieve data stored in the data field corresponding to chip select 302 and utilize the data to assert a chip select line that is connected to the intended flash bank, at block 904. In another implementation, flash protocol sequencer 408 may communicate a CHIP ID corresponding to the identified flash bank via the common interface.

Before communicating a command or data, at block 904, flash protocol sequencer 408 may determine if the command or data indicates the end of the first portion of the command sequence. In one implementation, the indication of the end may correspond to switch command 312 of FIG. 3.

If flash protocol sequencer 408 determines that the command or data is not an indication of the end of the first portion of the command sequence, the command or data may be communicated to the selected flash bank. In this manner, at block 904, flash protocol sequence 408 may sequentially communicate the first portion of the command sequence until the end is detected, switch 312, for example.

In response to detecting the end of the first command sequence, flash protocol sequencer 408 may generate an indication at block 906. Arbitration unit 406 of flash interface module 128 may receive this indication, in an embodiment. After generating the indication, flash protocol sequencer 408 may halt or suspend operation until flash protocol sequencer 408 receives a reference to the second portion of the same command sequence or another command sequence. In an embodiment, at block 906, flash protocol sequencer 408 may store the context in the FCT of the thread. This stored context may be used to restore the processor's state when the thread is next executed by flash protocol sequencer 408. At block 906, flash protocol sequencer 408 may also activate hardware to de-select the flash bank.

At block 908, flash protocol sequencer 408 may receive an indication to resume communicating the command sequence that was received at block 902. Alternatively, flash protocol sequencer 408 may receive a reference to a second command sequence where a second flash bank, 120-2 for example, coupled to the common flash interface is the intended recipient of the second command sequence. In either instance, flash protocol sequencer 406 will resume operation at block 902. In the instance where a second command sequence is received, previously describes steps will be executed to select the second flash bank.

In the foregoing discussion, an indication is generated after each portion of a command sequence. However, one of ordinary skill in the art will recognize that if a portion of a command sequence is not terminated with switch 312, for example, method 900 may operate to communicate the next sequential portion of the command sequence before signaling or indicating the end of communication of a portion of a command sequence.

FIGS. 10A-C are timing diagrams that illustrate alternate command sequence ordering, execution and communication based in timing and priority. Referring to FIG. 10A, a timing diagram is shown that illustrates the communication of command sequence 902 to flash bank 120-1 and command sequences 1004 and 1006 to flash bank 120-2 via a common flash interface. Importantly, in this scenario, flash interface module 128 is configured to adjust the priority of threads based on priority information received with a command sequence. Command sequence 1002 is associated with thread 402-1 and command sequences 1004 and 1006 are associated with thread 402-2. Command sequence 1002 comprises two portions 1002-1 and 1002-2. Each portion may comprise data fields that include chip select 304, command, data and switch 312. Command sequences 1002 and 1004 are received substantially contemporaneously by threads 402-1 and 402-2 at time 1003 and both threads 402-1 and 402-2 are initially assigned the same priority in this scenario.

Because threads 402-1 and 402-2 have the same priority, arbitration unit 406, in a round robin fashion, first selects thread 402-1 associated with command sequence 1002 and flash protocol sequencer 408 communicates portion 1002-1 to flash bank 120-1. At time 1005, arbitration unit 406 selects thread 402-2 associated with command sequence 1004 and flash protocol sequencer 408 communicates command sequence 1004 to flash bank 120-2.

Command generator 404 receives a high priority flash command destined for flash bank 120-2 at a time between 1005 and 1007 and in response generates command sequence 1006. Command generator 404 communicates command sequence 1006 to thread 402-2—the thread associated with flash bank 120-2. Separately, command generator 404 temporarily assigns the higher priority to thread 402-2. Arbitration unit 406 detects that thread 402-2 has a priority higher than the priority of thread 402-1 and that command sequence 1006 is ready to be communicated to flash bank 120-2. In response arbitration unit 406 schedules thread 402-2 and flash protocol sequencer 408 communicates command sequence 1006. Finally, arbitration unit 404 selects command sequence 1002 and flash protocol sequencer 408 communicates the second portion 1002-2 of command sequence 1002 to flash bank 120-1. Separately, arbitration unit 404 may reset the priority of thread 402-2 to its original priority. This scenario illustrates the preemption of the communication of a portion 1002-2 of lower priority command sequence 1002 by the communication of a higher priority command sequence 1006 although the command sequence 1006 was received after command sequence 1002.

FIG. 10B is a timing diagram that illustrates a scenario where thread 402-1 is created with a lower priority than thread 402-2. In this scenario, command sequence 1002 intended for flash bank 120-1 is received by thread 402-1 at time 1003. As a consequence, approximately at time 1003, thread 402-1 is transitioned to an active state. Thread 402-2 is inactive at time 1003 because no command sequence is available to be communicated to flash bank 120-2.

Arbitration unit 406 schedules thread 402-1 and flash protocol sequencer 408 communicates portion 1002-1 of command sequence to flash bank 120-1. Sometime between 1003 and 1005, thread 402-2 receives command sequence 1004 and consequently transitions to the active state. At time 1005, arbitration unit 406 detects that higher priority thread 402-2 is active and schedules thread 402-2 for execution. In response, flash protocol sequencer 408 communicates command sequence 1004 to flash bank 120-2. Thread 402-1 remains in the active state because a portion 1002-2 of command sequence 902 has not yet been communicated to flash bank 120-1. At time 1007, after communication of command sequence 1004, thread 402-2 returns to the inactive state and arbitration unit 406 schedules lower priority thread 402-1 for execution.

FIG. 10C is a timing diagram that illustrates a scenario where thread 402-1 has a higher priority than thread 402-2. In this scenario, it can be assumed that command sequence 1002 intended for flash bank 120-1 and command sequence 1004 intended for flash bank 120-2 arrive substantially contemporaneously at threads 402-1 and 402-2, respectively. Because thread 402-1 has a higher priority than thread 402-2, arbitration unit 406 selects thread 402-1 associated with command sequence 1002 for execution. Flash protocol sequencer 408 communicates portion 1002-1 of command sequence 1002 to flash bank 120-1 and in response to detecting switch 312 at the end of portion 1002-1, flash protocol sequencer 408 asserts a thread switch indication. In response to the thread switch indication, arbitration unit 406 again selects thread 402-1 for execution as it is still active because portion 1002-2 of command sequence 1002 has not yet been communicated. In response flash protocol sequencer 408 communicates command sequence 1002-2 and because there are not more portions to be communicated thread 402-1 transitions to the inactive state. Finally, because thread 402-2 is the only remaining active thread in this scenario, arbitration unit 406 selects thread 402-2 for execution and flash protocol sequencer 408 communicates the command sequence 1004 before transitioning thread 402-2 to the inactive state.

As previously mentioned, methods may be employed to judiciously allocate and de-allocate limited system resources to optimize data transfers in a system. Such methods may be implemented in the example flash interface module 128 of FIG. 1 to improve the communication of data between flash memory 116 and memory controller 118. Examples of such resources include direct memory access (DMA) channels in DMA controller 220. DMA channels may be employed to transfer blocks of memory with little or no intervention of processor 206. Importantly the DMA channels may operate across the same common interface thereby allowing or even enhancing parallel access of hardware components such as memory banks 120-1 and 120-2. Although the upcoming discussion references the allocation of DMA channels in DMA controller 220, one of ordinary skill in the art will recognize that allocation of other resources may also be performed using the teachings described herein.

Figure 11:
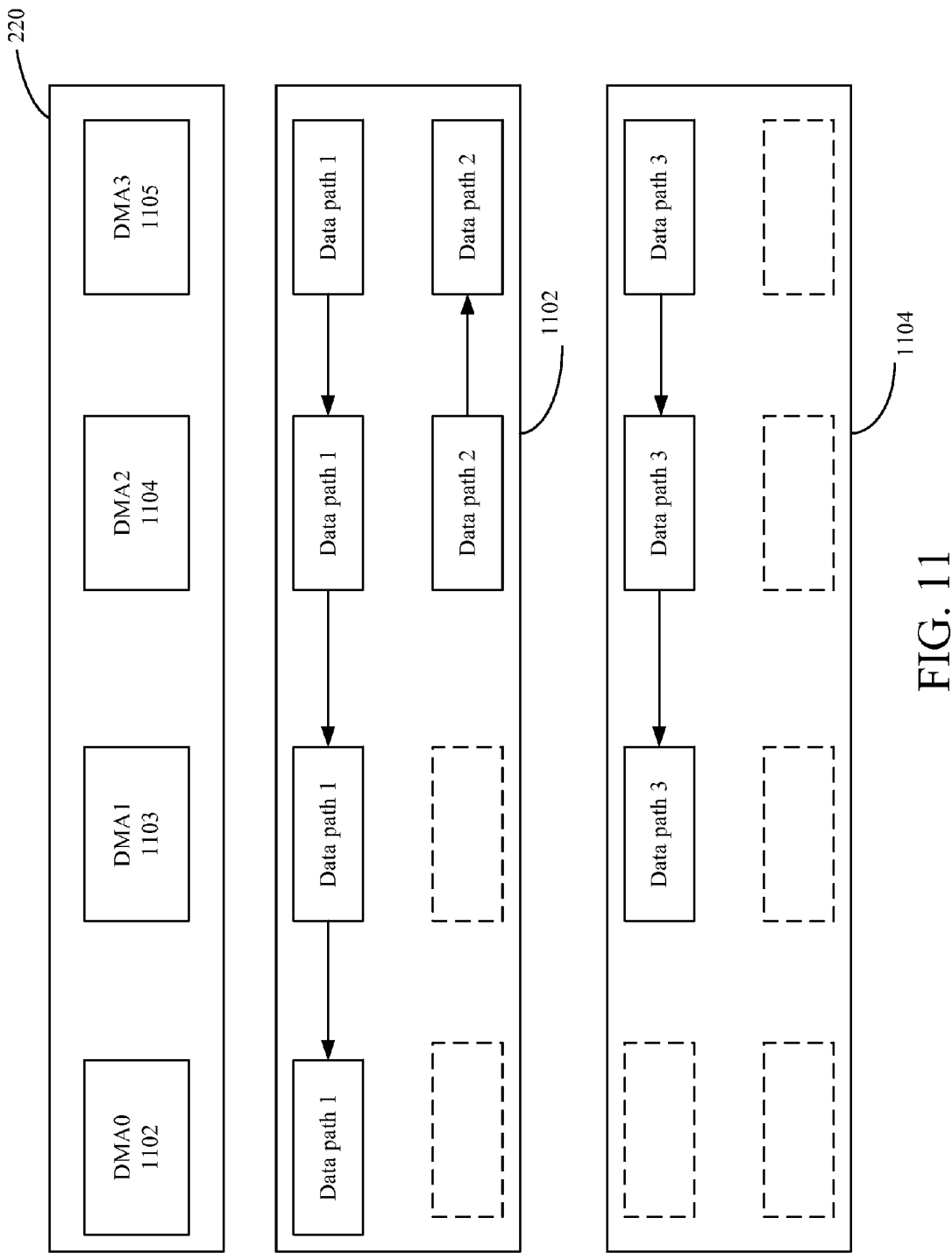
FIG. 11 is a conceptual representation of logical data paths for communicating data.

FIG. 11 depicts the concept of allocation of DMA channels of DMA controller 220 to data transfers between flash bank 120-1 and 120-2. In this example, DMA controller 220 has four DMA channels 1102, 1103, 1104 and 1105. In some embodiments, memory controller 118 may include a data path manager that manages the allocation and configuration of DMA channels 1102, 1103, 1104 and 1105. The four channels constitute the set of channels available for allocation to data transfers. Each of these DMA channels represents a logical data path for data transfers between the memory controller 118 and a flash bank. 1102 and 1104 correspond to the FCT of threads 402-1 and 402-2, respectively. A solid line box in an FCT of a thread indicates that a corresponding DMA channel is used for the data transfer being performed under the control of the thread. Thus, the DMA channels allocated to a thread may be a subset of the set of DMA channels available. The direction of the arrow head indicates the direction of the data transfer—right to left indicates ingress into memory controller 118 and left to right indicates egress to memory device 116. A dashed line box indicates that although the corresponding DMA channel is available for data transfers, the DMA channel is not allocated for the data transfer being performed by the thread. Four DMA channels are shown simply for ease of illustration and a fewer or greater number of DMA channels may be implemented.

In the scenario depicted in FIG. 11, DMA channels 1102-1105 are allocated to the ingress data transfer being performed by thread 402-1 between memory bank 120-1 and memory controller 118. In contrast, DMA channels 1104 and 1105 are allocated to the egress data transfer. Similarly, DMA channels 1103-1105 are allocated to the ingress data transfer being performed by thread 402-2 between memory bank 120-2 and memory controller 118. In contrast, no DMA channels are allocated to the egress data transfer. It is also noteworthy that DMA channels 1103, 1104 and 1105 are allocated to data transfers taking place between flash bank 120-1 and memory controller 118 as well as data transfers taking place between flash bank 120-2 and memory controller 118. In this case, data coming from flash bank 120-2 is interleaved with data coming from flash bank 120-1.

One of the advantages of storing the DMA channel information in the FCT of the thread performing the transfer is that flash protocol sequencer 408 can configure the appropriate resources associated with the allocated DMA channels. Separately, DMA channels can be de-allocated when a data transfer is completed. For example, memory controller 118 may allocate and deallocate DMA channels on a per flash command basis.

In some embodiments, during initialization of the system of FIG. 1, flash interface module 128 may be provided with a template which may include resource allocations for different flash commands. Separately, the template may also include resource allocations for different memory banks. If, for example, critical data is stored in flash bank 120-1, flash bank 120-1 may be allocated a greater share of the resources to speed up data transfers. Resource allocations based on the provided template results in flexibility.

Figure 12:
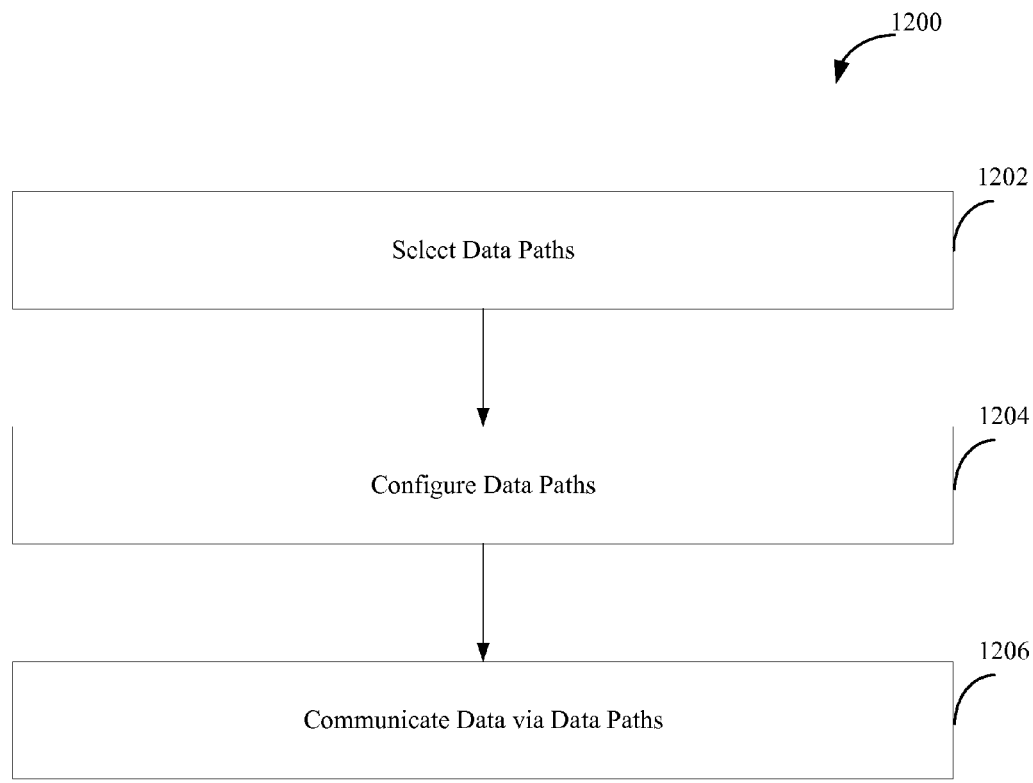
FIG. 12 is a flow diagram of an example method that allocates logical data paths to different data transfers.

FIG. 12 is a flow diagram of an example method 1200 for managing communication between memory controller 118 and flash memory 116. By way of example and without limitation, method 1200 may be implemented in flash interface module 128. Consequently, the upcoming discussion of method 1200 makes reference to FIG. 4.

At block 1202, data paths that may be used to effectuate the data transfer may be selected. The selection may be in response to detecting that a flash command is available to be communicated to flash memory 116. In an embodiment, at block 1202, the flash command may be analyzed and compared to the previously received template to determine if DMA channels need to be allocated to effectuate the data transfer. Separately, the identity of the flash bank may also be used to determine how many, if any, channels are to be allocated to the data transfer. In some embodiments, at block 1202, the amount of data to be transferred may be detected and based on the amount of data, an appropriate subset of DMA channels may be allocated for the transfer. The DMA channel information may be stored in the FCT of the thread that will be performing the data transfer. The direction of the data transfer may also be used to determine the subset of channels.

At block 1204 the selected subset of data channels may be configured. For example, at block 1204, flash protocol sequencer 408 may retrieve DMA channel information stored in the FCT of the thread being executed. The information may be used to allocate memory, program buffer descriptors associated with the selected DMA channels, enabling interrupts, clearing status registers etc.

At block 1206, data transfer may be performed via the selected DMA channels. Referring to the read command sequence 302 of FIG. 3, in response to receiving portion 302-3 of command sequence 302, data may be transferred via the DMA channels. At the conclusion of the data transfer, at block 1206, the DMA channels may be de-allocated, in one embodiment.

As previously discussed, flash interface module 128 may receive configuration information in the form of templates. The templates may be generated by host system 100 of FIG. 2 or memory controller 102 based on a particular use case. In an embodiment, the templates may be generated when memory controller 102 is initially powered on, in response to detecting available resources. Available resources may include available memory, DMA channels in DMA controller 220, system timers (not shown), etc. The templates may be stored in RAM 212 of FIG. 2, in one embodiment.

Figure 13:
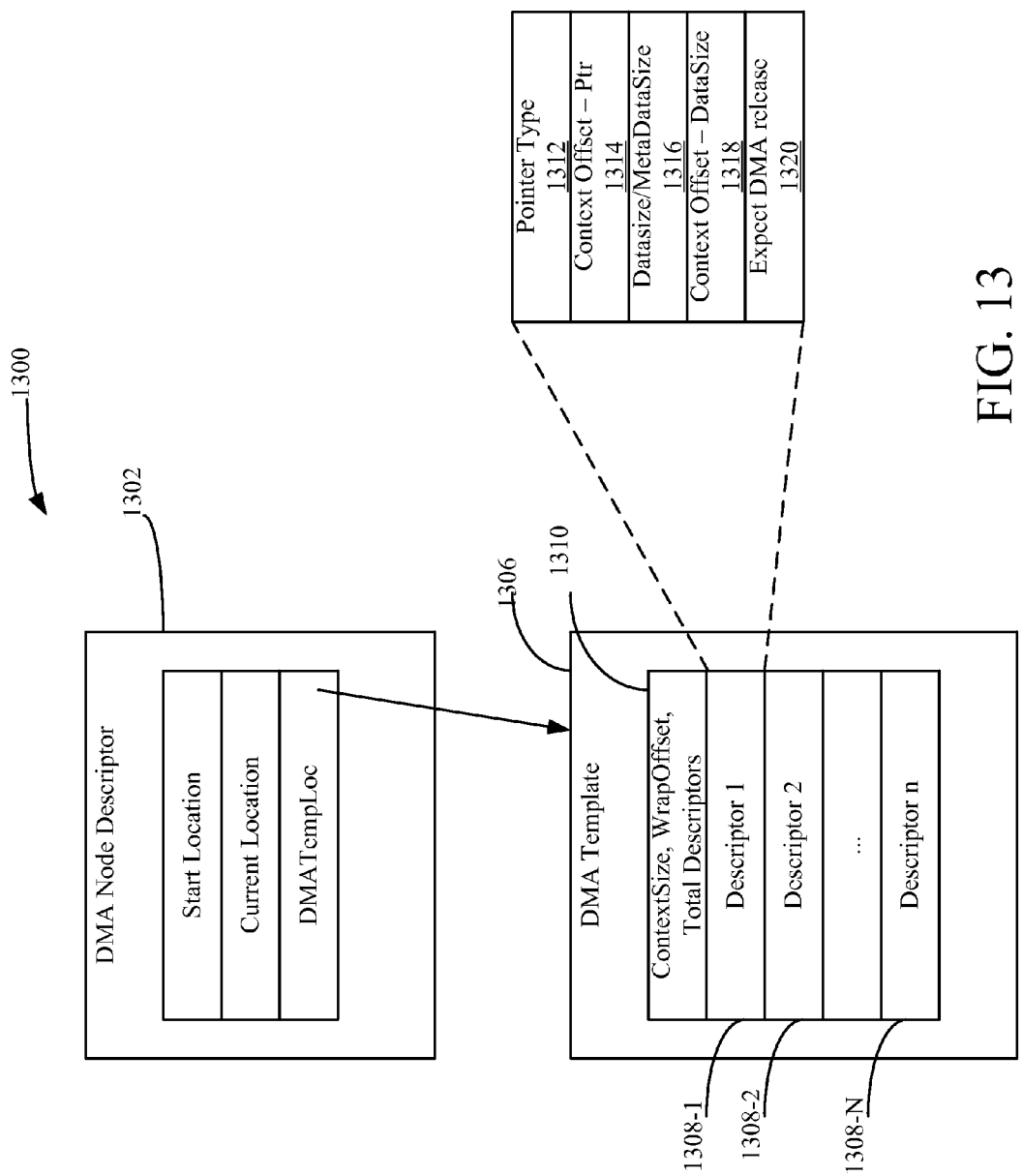
FIG. 13 is an example template that may be used to allow for the flexible allocation of resources.

FIG. 13 illustrates the layout of an example template structure 1300 that may be utilized to efficiently allocate resources in memory controller 102. The template structure 1300 includes data fields that describe a DMA node or channel 1302. However, the template structure 1300 may be adapted to suit other system resources.

Referring to FIG. 13, DMA node descriptor 1302 includes a pointer 1304 to DMA template 1306. DMA template 1306 includes configurable fields that include pointers to descriptors 1308-1 . . . 1308-N. DMA template 1306 also include data fields 1310 that provide an indication to DMA controller 220 of the number of descriptors that are assigned to the DMA channel associated with DMA template 1306. In an embodiment, template 1300 may also include an indication of the type of descriptor to be utilized with template 1300. Accordingly, based on this indication in the template, data fields or bit fields in a descriptor may be appropriately referenced and accessed by elements of memory system 102 and/or host system 100.

The foregoing discussion describes different novel methods of communicating data in a system. A system need not implement all of the methods described above. In some cases, a system may only implement features corresponding to the communication of portions of a command sequence. In some implementations of this system, arbitration unit 406 may implement only a round-robin method of switching between threads i.e. the threads have the same priority. In other systems, the threads may have different priorities. Still other systems may combine dynamic allocation of DMA channels with the use of threads to improve communication in the system. Furthermore even in these systems in some instances templates may be used to allocate resources and in other instances the use of templates may be avoided.

Further embodiments can be envisioned by one of ordinary skill in the art after reading the foregoing. In other embodiments, combinations or sub-combinations of the above disclosed invention can be advantageously made. The block diagrams of the architecture and flow diagrams are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

I claim:

1. A system for communicating with a flash device, the system comprising:
   a memory controller having a flash interface module, the memory controller adapted to be communicatively coupled to a host system, the memory controller configured to receive a template, the template comprising a first set of resources for communicating data between the memory controller and the flash device and based on the template, the memory controller adapted to configure the first set of resources for communicating data between the memory controller and the first flash device; and
   wherein the flash interface module is communicatively coupled to the memory controller and configured to communicate data between the memory controller and the first flash device via the first set of resources,
   wherein the flash interface module is further configured to select a first subset of logical data paths from a set of logical paths based on analyzing the template, further wherein the flash interface module configures the first set of resources based on the template.

2. The system of claim 1 wherein the flash interface module is further configured to select the first set of resources based on the template.

3. The system of claim 2 wherein the flash interface module is further configured to configure a plurality of descriptors and associate the plurality of descriptors with each of the first subset of logical data paths.

4. The system of claim 3 wherein the flash interface module if further configured to associate a respective buffer with each of the plurality of descriptors.

5. The system of claim 4 wherein the flash interface module is further configured to cause the communication of data between the buffer associated with at least one of the plurality of descriptors and the flash device via the first subset of logical data paths.

6. A method of communicating data between a memory controller and a memory device, the method comprising:
   receiving a first template, the first template comprising a first set of resources for communicating data between the memory controller and the memory device;
   selecting a first subset of logical data paths from a set of logical paths based on an analysis of the first template;
   configuring, based on the first template, the first set of resources by configuring the first subset of data paths; and
   communicating data between the memory controller and the memory device via the configured first set of resources.

7. The method of claim 6 further comprising:
   receiving a second template, the second template comprising a second set of resources for communicating data between the memory controller and the memory device;
   selecting a second subset of logical data paths from the set of logical paths based on an analysis of the second template;
   configuring, based on the second template, the second set of resources by configuring the second subset of data paths; and
   communicating data between the memory controller and the memory device via the configured second set of resources.

8. The method of claim 6 wherein the configuring the first subset of data paths includes configuring a plurality of descriptors associated with each of the first subset of data paths.

9. The method of claim 8 wherein the configuring each of the plurality of descriptors including associating a respective buffer with each of the plurality of descriptors.

10. The method of claim 9 wherein communicating data between the memory controller and the memory device comprises communicating data between the buffer associated with at least one of the plurality of descriptors and the memory controller.

11. The method of claim 6 wherein the memory device comprises a flash device.

12. A method of communication comprising:
   receiving a first template comprising a first set of resources for communicating data between a memory controller and a memory device;
   selecting a first subset of logical data paths from a set of logical paths, wherein the selecting is based on the first template;
   configuring, based on the first template, the first set of resources by configuring the first subset of logical data paths; and
   communicating data between the memory controller and the flash device via the configured first set of resources.

13. The method of claim 12 wherein the configuring the first subset of data paths includes configuring a plurality of descriptors associated with each of the first subset of data paths.

14. The method of claim 13 wherein the configuring each of the plurality of descriptors including associating a respective buffer with each of the plurality of descriptors.

15. The method of claim 14 wherein communicating data between the memory controller and the memory device comprises communicating data between the buffer associated with at least one of the plurality of descriptors and the memory controller.

16. The method of claim 12 wherein the memory device comprises a flash device.

* * * * *